(12) United States Patent
Mynam et al.

(10) Patent No.: US 7,706,381 B2
(45) Date of Patent: Apr. 27, 2010

(54) APPROACHES FOR SWITCHING TRANSPORT PROTOCOL CONNECTION KEYS

(75) Inventors: Satish K. Mynam, San Jose, CA (US); Anatha Ramaiah, Sunnyvale, CA (US); Chandrashekhar Appanna, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 628 days.

(21) Appl. No.: 11/329,509

(22) Filed: Jan. 10, 2006

(65) Prior Publication Data
US 2007/0160063 A1 Jul. 12, 2007

(51) Int. Cl.
*H04L 12/28* (2006.01)
(52) U.S. Cl. .................................. 370/395.1; 370/429
(58) Field of Classification Search ................. 370/429, 370/236, 395; 713/171, 155
See application file for complete search history.

(56) References Cited

U.S. PATENT DOCUMENTS

| 6,061,799 | A | 5/2000 | Eldridge et al. |
| 6,295,361 | B1 | 9/2001 | Kadansky et al. |
| 6,502,192 | B1 | 12/2002 | Nguyen |
| 6,895,394 | B1 | 5/2005 | Kremer et al. |
| 7,100,054 | B2 | 8/2006 | Wenisch et al. |
| 7,194,761 | B1 | 3/2007 | Champagne |
| 7,231,458 | B2 | 6/2007 | Tenereillo et al. |
| 7,346,682 | B2 * | 3/2008 | Basani et al. ............ 709/224 |
| 2002/0150253 | A1 | 10/2002 | Brezak et al. |
| 2003/0142364 | A1 * | 7/2003 | Goldstone ................ 358/402 |
| 2003/0163691 | A1 | 8/2003 | Johnson |
| 2004/0034773 | A1 | 2/2004 | Balabine et al. |
| 2004/0223497 | A1 | 11/2004 | Sanderson et al. |
| 2005/0027985 | A1 * | 2/2005 | Sprunk et al. ............ 713/171 |
| 2005/0132214 | A1 | 6/2005 | Naftali |
| 2005/0160478 | A1 | 7/2005 | Ramaiah et al. |
| 2006/0101271 | A1 | 5/2006 | Thomas |
| 2007/0005973 | A1 | 1/2007 | Mynam et al. |

(Continued)

OTHER PUBLICATIONS

R. Bonica, et al., "Authentication for TCP-based Routing and Management Protocols", draft-bonica-tcp-auth-00, Juniper Networks, TCPM Working Group Internet—Draft, Sep. 16, 2005.

(Continued)

*Primary Examiner*—Dang T Ton
*Assistant Examiner*—Wei Zhao
(74) *Attorney, Agent, or Firm*—Hickman Palermo Truong & Becker LLP (57) ABSTRACT

Approaches are disclosed for switching transport protocol connection keys. A first node sends a keychange request message to a second node, causing the second node to accept subsequent messages digitally signed with a first or second key. The second node sends an acknowledgment message to the first node, causing the first node to accept subsequent messages digitally signed with the first or second key. The first node receives a new message digitally signed with the second key from the second node and determines that there are no remaining messages to be received digitally signed with the first key. In response thereto, the first node only accepts messages digitally signed with the second key and sends a message signed with the second key to the second node, causing the second node to only accept messages digitally signed with the second key.

32 Claims, 6 Drawing Sheets

U.S. PATENT DOCUMENTS

2007/0005985 A1  1/2007  Eldar et al.
2007/0101129 A1* 5/2007  Wong et al. ................. 713/160

OTHER PUBLICATIONS

R. Bonica, et al., "Authentication for TCP-based Routing and Management Protocols" draft-bonica-tcp-auth-01, Juniper Networks, TCPM Working Group Internet—Draft, Sep. 27, 2005.

R. Bonica, et al., "Authentication for TCP-based Routing and Management Protocols", draft-bonica-tcp-auth-02, Juniper Networks, TCPM Working Group Internet—Draft, Oct. 5, 2005.

A. Ramaiah, et al., "Key Rollover Schemes for TCP Connections Employing a Shared Key Model", Cisco Systems, Network Working Group Internet—Draft, Nov. 23, 2005.

R. Rivest, "The MD5 Message-Digest Algorithm", MIT Laboratory for Computer Science and RSA Data Security, Inc., Network Working Group Request for Comments: 1321, Apr. 1992.

Y. Rekhter, et al. "A Border Gateway Protocol 4 (BGP-4)", T.J. Watson Research Center, IBM Corp. and Cisco Systems, Network Working Group Request for Comments: 1771, Mar. 1995.

F. Baker, et al., "RIP-2 MD5 Authentication", Cisco Systems, Network Working Group Request for Comments: 2082, Jan. 1997.

A. Heffernan, "Protection of BGP Sessions via the TCP MD5 Signature Option", Cisco Systems, Network Working Group Request for Comments: 2385, Aug. 1998.

F. Baker, et al., "RSVP Cryptographic Authentication", Cisco, USC/ISI, and Microsoft, Network Working Group Request for Comments: 2747, Jan. 2000.

L. Andersson, et al. "LDP Specification", Nortel Networks, Inc., Ennovate Networks, IBM Corp., PhotonEx Corp, and Cisco Systems, Inc., Network Working Group Request for Comments: 3036, Jan. 2001.

International Searching Authority, "Notification of Transmittal of the International Search Report and the Written Opinion of the International Searching Authority, or the Declaration", International application No. PCT/US06/40959, received Oct. 18, 2007, 11 pages.

Claims, International application No. PCT/US06/40959, 4 pages.

* cited by examiner

APPROACHES FOR SWITCHING TRANSPORT PROTOCOL CONNECTION KEYS

CROSS-REFERENCE TO RELATED APPLICATIONS

The subject matter herein generally relates to the subject matter of prior U.S. application Ser. No. 11/173,690, filed Jul. 1, 2005, of Satish K. Mynam et al., entitled "Approaches for Switching Transport Protocol Connection Keys" ("Mynam et al.") and the subject matter of U.S. application Ser. No. 11/261,683, filed on Oct. 28, 2005, of John C. Wong et al., entitled "Approaches For Automatically Switching Message Authentication Keys."

FIELD OF THE INVENTION

The present invention generally relates to authenticating message communications. The invention relates more specifically to methods for changing the keys that are used to digitally sign transport protocol connections.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Transmission Control Protocol (TCP) is a transport layer protocol that provides a reliable connection-oriented data delivery service to upper-layer applications through the use of sequenced acknowledgment with retransmission of segments when necessary. In a typical TCP implementation, a TCP connection is established between two TCP endpoints that are established on two hosts. A TCP endpoint is maintained by the TCP module (or stack) of a host and is represented as the combination of an Internet Protocol (IP) address of the host and a TCP port number.

TCP uses a stream data transfer mechanism to deliver an unstructured stream of bytes between TCP endpoints. The bytes in the stream are numbered sequentially and are grouped into TCP segments for transmission over the TCP connection between the TCP endpoints. A TCP segment transmitted over a TCP connection includes a header portion and a payload portion, and can be identified by the sequence number of the first byte in the payload portion of the segment. The transport service provided by TCP is used by upper-layer applications to exchange application-specific data over the TCP connection.

One example of an upper-layer application that uses TCP to exchange data is Border Gateway Protocol (BGP). BGP is a peer-to-peer routing protocol the latest version of which, BGP-4, is defined in *RFC*1771 that was published by the Internet Engineering Task Force (IETF) in March 1995. In order to exchange routing information, two BGP hosts, or peers, first establish a TCP connection, and then negotiate a BGP session in order to exchange network routes. Another example of an upper-layer application that uses TCP to exchange data is Label Distribution Protocol (LDP). LDP is a protocol defined for the MultiProtocol Label Switching (MPLS) architecture and is described in *RFC*3036 published by IETF in January 2001. In a MPLS network, two Label Switching Routers (LSRs), or LDP peers, establish a bi-directional LDP session over a TCP connection in order to exchange label-mapping information that maps network layer routing information directly to data-link layer switched paths.

TCP, however, is vulnerable to data injection attacks. In a data injection attack, an attacker guesses parameter values for a valid TCP connection and uses these parameter values to send spurious TCP segments that contain malicious or spurious data payloads. These spurious TCP segments may affect the state of the TCP connection itself or may be intended for an upper-layer application. If the receiving TCP endpoint passes such segments to the upper-layer application various problems may occur when the application acts on or executes the data payloads. The consequences of data injection attacks can be severe. For example, when a BGP session is disrupted by a change in the state of the associated TCP connection, the BGP peers that established the session may have to discard all BGP routes that were exchanged during the session and may have to re-synchronize their routing information with peer routers in the network.

One type of a data injection attack is a TCP RST attack. In a TCP RST attack, an attacker uses the parameters of a valid TCP connection to construct and send spurious TCP segments that request closing and re-setting of the TCP connection by setting the RST (reset) bit in the TCP segment's headers.

One prior approach for preventing such data injection attacks minimizes the chances that an attacker would be able to determine the parameters of a valid TCP connection. In this prior approach, a TCP endpoint computes a digital signature or message digest for each TCP segment that it sends, and includes the signature in the TCP segment header. The signature is computed based on a key or a password known only to both TCP endpoints, and uses the contents of one or more fields of the TCP segment as input. Thus, in order to successfully launch a data injection attack, an attacker would not only have to determine the valid TCP connection parameters, but would also have to guess the key or password used to produce the TCP segment-signature.

One particular implementation of this prior approach, which implementation is used for protecting BGP sessions, is described in *RFC*2385 published by IETF in August 1998. In this implementation, a TCP OPTION has been defined for carrying a Message-Digest5 (MD5) hash value in a TCP segment. The MD5 algorithm (as defined in *RFC*1321 published by IETF in April 1992) takes as input a message of arbitrary length and produces as output a 128-bit signature, or "message digest", of the input. In this implementation, every TCP segment sent on a TCP connection contains, in the OPTIONS field of the TCP segment header, a 16-byte MD5 signature produced by applying the MD5 algorithm to the following items in order:

1. The TCP segment pseudo-header (in the order: source IP address, destination IP address, zero-padded protocol number, and segment length);
2. The TCP segment header (excluding the OPTIONS field, and assuming a checksum of zero);
3. The TCP segment data (if any); and
4. An independently-specified key or password known to both TCP endpoints and presumably specific to the TCP connection.

Upon receiving a TCP segment signed with a MD5 signature, the receiving TCP endpoint computes its own digest for the TCP segment from same data and by using its own key. The receiving TCP endpoint then compares the computed digest with the MD5 signature included in the OPTIONS field of the TCP segment. If the computed digest matches the MD5 signature included in the TCP segment, the receiving TCP endpoint validates the TCP segment and passes the payload portion of segment to the recipient upper-layer application. If the comparison fails, the TCP endpoint silently discards the TCP segment and sends back no acknowledgement.

The above approach, however, has numerous disadvantages. One disadvantage of the above approach is that, although difficult, it may not be impossible for an attacker to produce a valid signature for a malicious TCP segment that it wants to inject in the TCP connection. For example, since the MD5 algorithm is prone to a successful cryptanalytic attack, it is not impossible for an attacker to sniff a large number of similar TCP segments and to deduce the key used to create the MD5 signatures for TCP segments. This disadvantage causes serious security concerns, especially for upper-layer applications, such as BGP, that use TCP connections to run sessions for very long periods of time.

Another disadvantage of the above approach is that in some situations it is very difficult to change the TCP connection keys without significant disruption to upper-layer applications. Since both TCP endpoints must use the same key to produce signatures for the TCP segments associated with a TCP connection, when the key associated with a TCP connection needs to be changed, both TCP endpoints must change the key nearly simultaneously in order to prevent loss of data transmitted between the upper-layer applications over the TCP connection.

For example, in a BGP implementation that is in accord with *RFC*2385, when BGP peers establish a BGP session with each other over a TCP connection, both BGP peers may configure their respective TCP endpoints to use a shared MD5 encryption key or password. The shared MD5 encryption key may be provisioned to the BGP peers beforehand. Some situations may arise, however, which require that the MD5 encryption key must be changed. For example, a MD5 encryption key may need to be changed because of security concerns related to personnel changes (e.g. a network administrator leaving the company). In another example, if the BGP session is a long running session and is established between a BGP peer in an Internet Service Provider (ISP) network and a BGP peer in a customer network, it may be desirable to change the MD5 encryption key periodically in order to prevent a potential attacker from guessing the key by sniffing and analyzing a large number of TCP segments sent over the TCP connection associated with the BGP session.

However, once the BGP session is established there is no practical way to change the MD5 encryption key because BGP uses its own KEEPALIVE mechanism to detect whether the BGP session is active. BGP peers disable the TCP Hold-Timer for the TCP connection, and use their own BGP KEEPALIVE HoldTimer, the value of which is negotiated during the establishing of the BGP session. A BGP peer would periodically send BGP KEEPALIVE messages to ensure that the HoldTimer on its BGP peer does not expire. For example, if the BGP peers negotiate the default BGP HoldTimer interval of 180 seconds, absent the exchange of any other BGP messages a BGP peer would send a BGP KEEPALIVE message every 60 seconds or so. If the BGP peer does not receive a communication over the BGP session within the BGP KEEPALIVE HoldTimer interval, it sends out a HoldTimer Expired Error and closes the BGP session.

Thus, if the MD5 encryption key, which is used by a BGP peer in BGP session established over a TCP connection, needs to be changed, the key must be changed on both TCP endpoints within an interval of time that is smaller than the BGP HoldTimer. The interval of time during which the keys are changed on both TCP endpoints must be smaller than the BGP HoldTimer in order to prevent the TCP endpoint from silently discarding TCP segments signed with the old key that carry BGP messages of the BGP session. However, in a large network such as an ISP, it is practically impossible to change the MD5 encryption keys on all TCP endpoints that support BGP peers within an interval of time as small as a BGP HoldTimer interval.

U.S. application Ser. No. 11/173,690 of Satish Mynam et al. ("Mynam et al.") proposes a key change solution in which a first TCP module accepts messages signed with both an old MD5 encryption key and a new MD5 encryption key. This is done without signaling to a second TCP module that the first TCP module is prepared to receive messages signed with a new MD5 encryption key. Thus, Mynam et al. proposes to allow a TCP module to enter a "key overlap" phase until a message using the new MD5 encryption key is received. However, drawbacks of Mynam et al. include the chance of denial of service attacks during the overlap of the old and new MD5 encryption keys with using spoofed MD5 encryption key based TCP segments.

Based on the foregoing, there is a clear need for techniques that overcome the disadvantages of the prior approach described above for preventing data injection attacks.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Approaches for switching transport protocol connection keys are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
    3.0 Approach for Switching Transport Protocol Connection Keys
        3.1 Extended MD5 Option
        3.2 Approach for Initiating a Key Switchover
        3.3 Approach for Completing a Key Switchover 4.0 Implementation Mechanisms—Hardware Overview 5.0 Extensions and Alternatives

1.0 General Overview

The needs identified in the foregoing Background, and other needs and objects that will become apparent for the following description, are achieved in the present invention, which comprises, in one aspect, a method for switching transport protocol keys comprising sending a keychange request message from a first network node to a second node, wherein said keychange request message causes the second node to accept subsequent messages that are digitally signed with either a first key or a second key; receiving a first response message from the second node acknowledging the receipt of the keychange request message; based on the first response message, accepting subsequent messages digitally signed with either the first key or the second key; receiving a first subsequent message digitally signed with the second key from the second node; and determining that there are no remaining messages to be received digitally signed with the first key, and in response thereto, only accepting messages digitally signed with the second key from the second node and sending a second subsequent message digitally signed with the second key to the second node wherein said second subsequent message causes the second node to accept only messages digitally signed with the second key.

According to one feature of this aspect the keychange request message comprises an Extended MessageDigest5 (MD5) Option in a header of a Transmission Control Protocol (TCP) segment. In another feature, the Extended MD5 Option comprises a last two bytes of a regular MD5 Option in a header of the TCP segment.

In still another feature, the keychange request message includes an Extended MD5 Option with a first setting, wherein the first setting represents an initialization of the keychange request; and, the first response message includes an Extended MD5 Option with a second setting, wherein the second setting represents acknowledgment of the keychange request.

In yet another feature, the first key is an MD5 encryption key and the second key is an MD5 encryption key. In a further feature, the method comprises the step of determining that the second network node is configured to facilitate a key switchover using an Extended MD5 Option in a header of a TCP segment.

In a further feature, the first subsequent message is in a new in-sequence TCP segment and the second subsequent message is in a TCP ACK segment. In still another feature, said first key and said second key are selected from a list of keys supplied to said first node and said second nodes.

In other aspects, the invention encompasses a computer apparatus and a computer-readable medium configured to carry out the foregoing steps.

2.0 Structural and Functional Overview

Figure 1A:
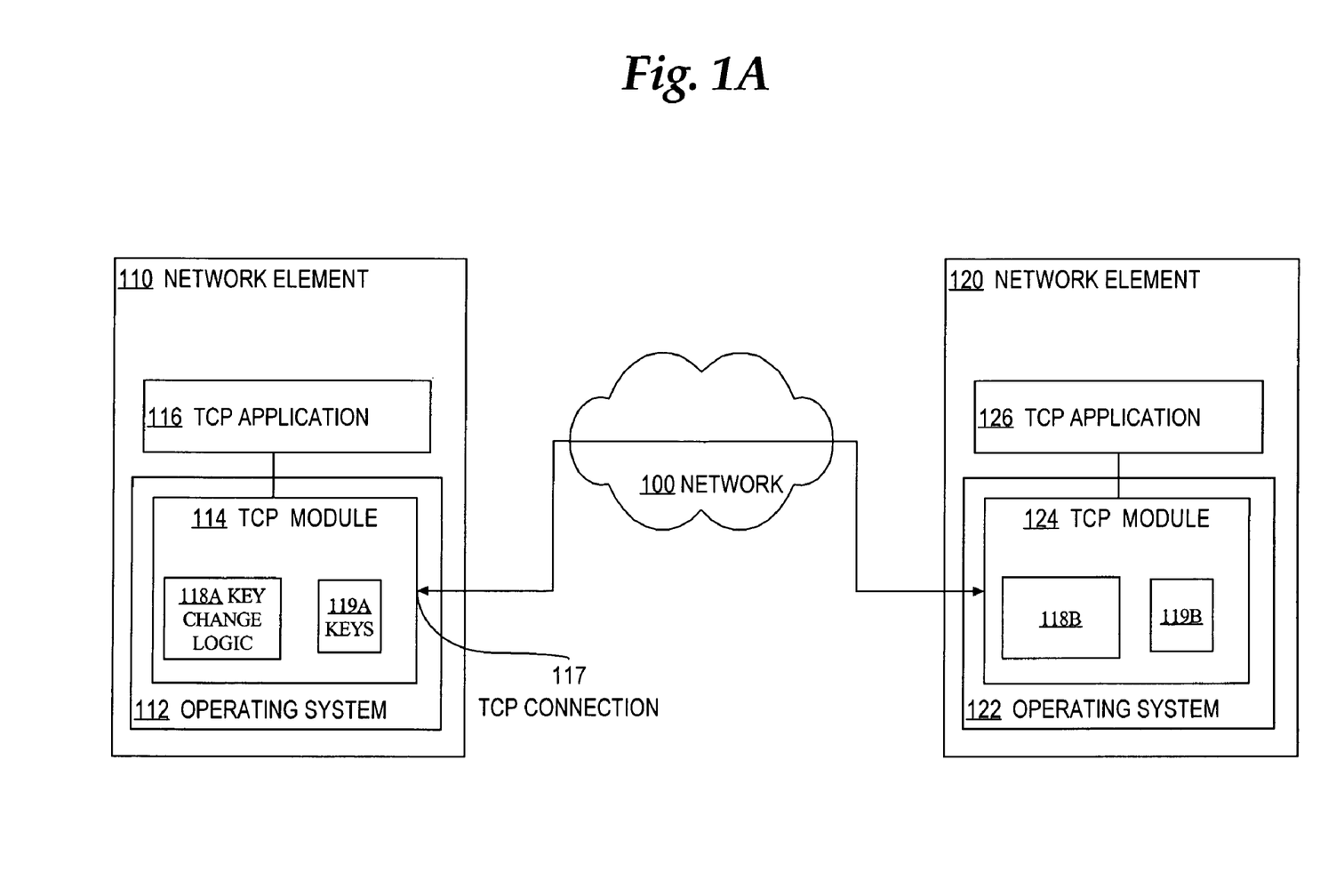
FIG. 1A is a block diagram that illustrates an operational context in which embodiments may be implemented.

FIG. 1A is a block diagram that illustrates an operational context in which embodiments of the approaches for switching transport protocol keys described herein may be implemented.

Network element 110 and network element 120 are communicatively connected over network 100. In FIG. 1A, network elements 110 and 120 are routers each of which executes one or more TCP Applications 116, 126. The approaches described herein, however, are not limited to being implemented on routers executing TCP Applications, and for this reason the network elements and the processes that execute on them depicted in FIG. 1A are to be regarded in an illustrative rather than a restrictive sense.

Network element 110 includes operating system 112 that includes a TCP module 114. TCP Application 116 runs logically on top of operating system 112 and utilizes the transport services provided by TCP module 114. Similarly, network element 120 includes operating system 122 that includes a TCP module 124. TCP Application 126 runs on top of operating system 122 and utilizes the transport services provided by TCP module 124.

TCP Application 116 on network element 110 and TCP Application 126 on network element 120 have established a TCP session between them over TCP connection 117. TCP connection 117 is associated with two TCP endpoints managed respectively by TCP module 114 on network element 110 and by TCP module 116 on network element 120.

TCP Module 114 includes Key Change Logic 118A and Key List 119A while TCP Module 124 includes Key Change Logic 118B and Key List 119B. Key Change Logic 118A, 118B comprises computer program instructions or other software elements for selecting a message authentication key for use in creating signatures and computing digests using the approaches herein. In one embodiment, Key Change Logic 118A, 118B may select message authentication keys in a sequential order, such that during a key switchover, the next message authentication key to be selected will be N+1, where N is the message authentication key currently being used. In another embodiment, Key Change Logic 118A, 118B may be configured to select a random message authentication key using a common random seed. Key Change Logic 118A, 118B is not restricted to any method of selecting keys, and may select keys using any type of selection algorithm.

In operation, according to one embodiment, upon the establishment of the TCP session, TCP Application 116 configures TCP module 114 with a first message authentication key on Key List 119A, which is used by TCP module 114 to create digital signatures for TCP segments that carry TCP messages to TCP Application 126 over TCP connection 117. Similarly, TCP Application 126 configures TCP module 124 with the same message authentication key, which is used by TCP module 124 to create MD5 signatures for TCP segments that carry TCP messages to TCP Application 116 over TCP connection 117. TCP Module 114 selects a message authentication key from Key List 119A using Key Change Logic 118A. Similarly, TCP Module 124 selects a message authentication key from Key List 119B using Key Change Logic 118B.

In one embodiment, Key List 119A and Key List 119B are pre-provisioned ordered lists of identical message authentication keys. Thus, both network elements 110 and 120 may have the same ordered set of message authentication keys such that after each key switchover, network elements 110 and 120 are each using the same next message authentication key. In other embodiments, network elements 110 and 120 may each have two such key lists. One key list may comprise message authentication keys in a particular order for sending TCP segments while the other key list may comprise a different set of message authentication keys used to compute authentication values for received segments. Thus, each of network elements 110 and 120 sends TCP segments carrying message digests computed using its own message authentication key and verifies received TCP segments using the other's message authentication key. A key switchover causes the next key in both lists to be selected.

After the TCP session is established, when TCP Application 116 decides to send a TCP message to TCP Application 126, TCP Application 116 communicates the TCP message to TCP module 114. TCP module 114 receives the contents of the message and, if necessary, breaks up the message for inclusion in the payload portion of one or more TCP segments. TCP module 114 then creates the one or more TCP segments, and, for each TCP segment, computes an MD5 signature by using the message authentication key previously chosen from Key List 119A using Key Change Logic 118A. The one or more TCP segments are transmitted to TCP module 124 over TCP connection 117, and placed in a re-transmission queue for the connection at TCP module 114 in case retransmission of the TCP segments is needed. Upon receipt of the one or more TCP segments, TCP module 124 computes a digest for each segment by using a message authentication key chosen from Key List 119B using Key Changing Logic 118B. For each TCP segment, if the computed digest matches the MD5 signature included in the TCP segment, TCP module 124 validates the segment. TCP module 124 then assembles the original TCP message from the contents of the one or more received TCP segments, if necessary, and passes the message to TCP Application 126.

TCP Application 126 on network element 120 sends TCP messages over TCP connection 117 to TCP Application 116 in network element 110 in an analogous manner.

Figure 1B:
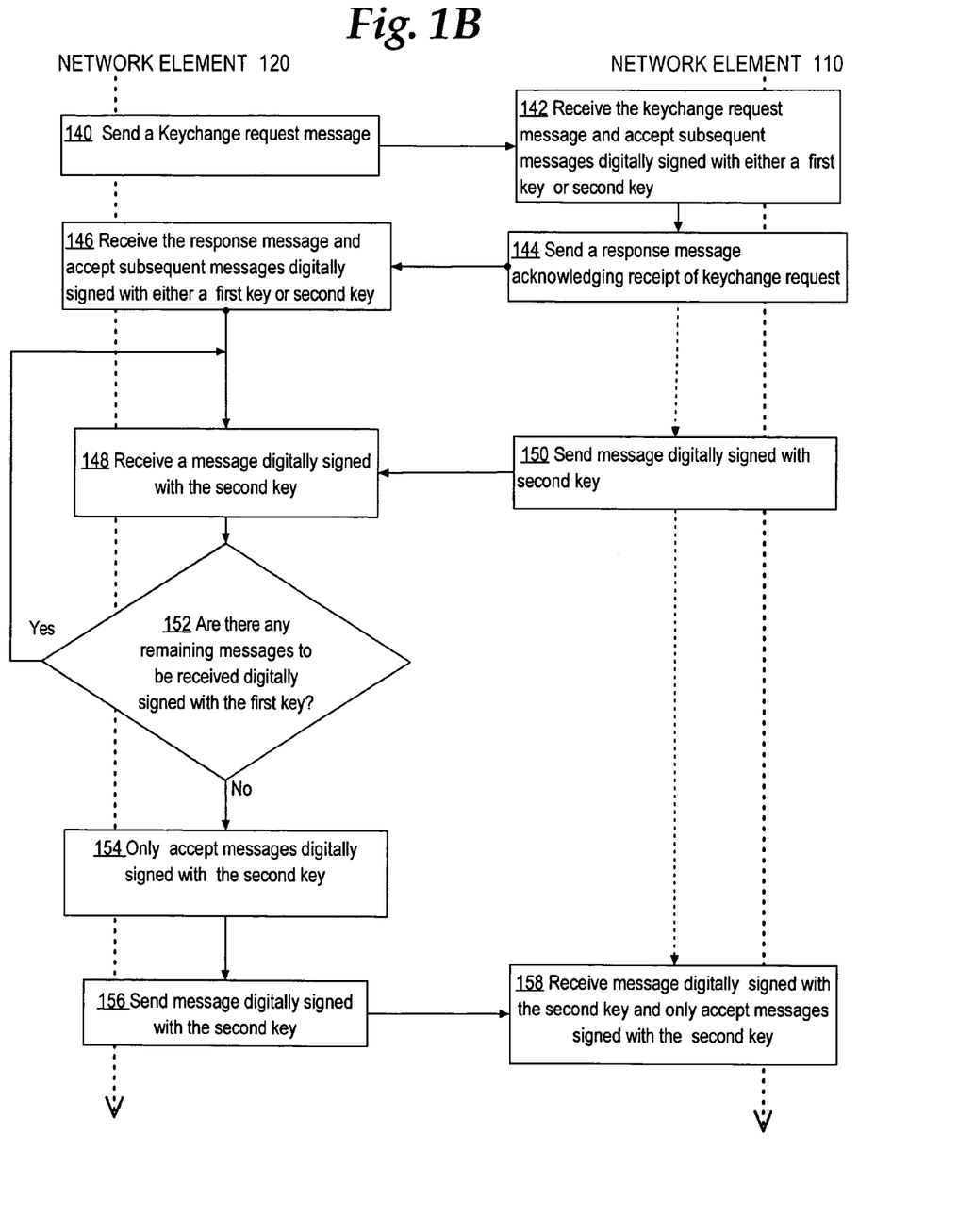
FIG. 1B is a flow diagram that illustrates an overview of a method for switching message authentication keys according to an example embodiment.

FIG. 1B is a flow diagram that illustrates an overview of a method for switching message authentication keys according to an example embodiment Assume that TCP module 114 of network element 120 wishes to signal a keychange. At step 140, network element 120 sends a Keychange request message across TCP connection 117 to network element 110 using TCP module 114. At step 142, network element 110 receives the keychange request message via TCP module 124. Using Key Selection Logic 1181B, TCP module 124 uses a first message authentication key and a second message authentication key from Key List 119B to compute a digest for any subsequent messages, thereby accepting subsequent messages from network element 120 carrying either a first message authentication key or a second message authentication key selected from Key List 119A.

At step 144, network element 110 sends a response message acknowledging receipt of the keychange request message to network element 120. At step 146, when network element 120 receives the response message via TCP module 114, TCP module 113 uses Key Change Logic 118A to select a first message authentication key and a second message authentication key from Key List 119A to compute a digest for any subsequent messages, thereby accepting subsequent messages from network element 110 carrying either a first message authentication key or a second message authentication key selected from Key List 119B.

At step 148, network element 110 sends a TCP message through TCP module 124 to network element 110 using an MD5 signature computed from a second message authentication from Key List 119B. At step 148, network element 120 receives the TCP Message via TCP module 114 and computes a digest using the second message authentication key from Key List 119A. After receiving the message computed with the second message authentication key, network element 120, at step 152, determines if there are any remaining messages to be received computed to use the first message authentication key. Network element 120 may make such a determination by tracking the sequence number of TCP segments. If it is determined that there are remaining messages to be received using the first message authentication key, network element 120 would continue to send and receive messages signed with the first key.

If it is determined that there are no more remaining messages to be received using the first message authentication key, network element 120 proceeds to step 154. At step 154, using Key Change Logic 118A, TCP Module would use only the second key in Key List 119A to compute a digest for subsequent messages. Next, at step 156, network element 120 sends a TCP message through TCP module 124 to network element 110 using an MD5 signature computed from the second message authentication key. At step 158, when network element 110 receives the TCP message, TCP module 124 uses Key Selection Logic 118B to use only the second message authentication key in Key List 119B to complete a digest for subsequent messages. At this point, because both network element 120 and network element 110 have been configured to use only the second message authentication key, and both TCP Modules 113 and 124 have been configured to compute digests using the second message authentication key, the keychange is complete. Further, while FIG. 1B has been described with reference to FIG. 1A to present a clear example, the broad approach of FIG. 1B may be used in other contexts.

Embodiments for switching transport protocol keys described herein may be implemented in a variety of operational contexts. For example, the transport protocol messages may be signed with message signatures computed by any type of now known or later developed hash or message digest algorithms, such as, for example, the Secure Hash Algorithm-1 (SHA-1) algorithm.

Moreover, different embodiments may be implemented over a variety of connection-oriented or connectionless transport protocols, such as, for example, User Datagram Protocol (UDP), Stream Control Transmission Protocol (TCP), and Datagram Congestion Control Protocol (DCCP). Furthermore, different embodiments of the approaches described herein may be implemented to provide transport protocol key switchover for a wide variety of upper-layer applications, such as, for example, LDP and Multicast Source Discovery Protocol. For this reason, the embodiments of the approaches described herein and the operational context depicted in FIG. 1A and FIG. 2B are to be regarded in an illustrative rather than a restrictive sense.

Figure 2:
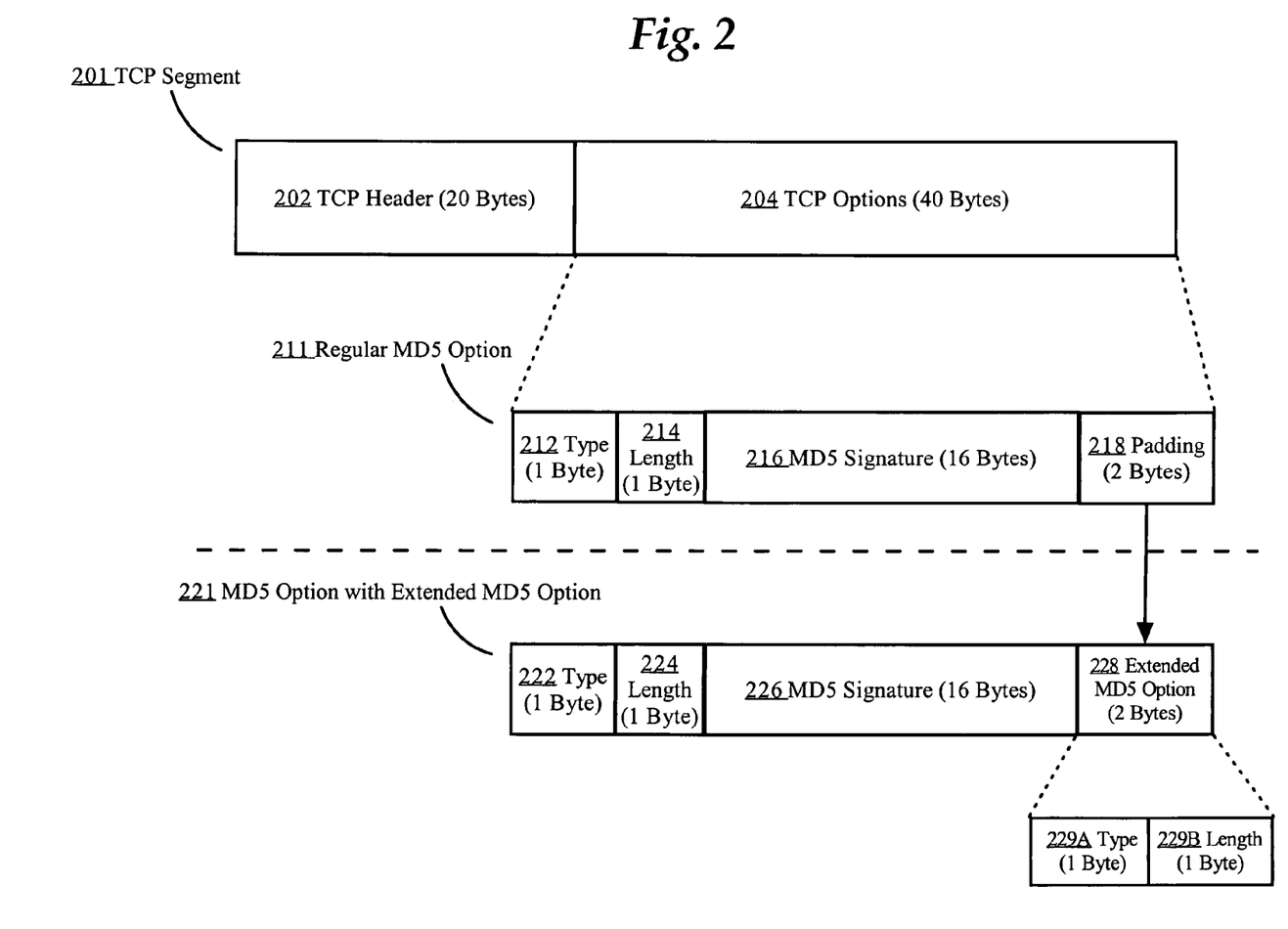
FIG. 2 is a block diagram that illustrates an overview of an Extended MD5 Option in a TCP segment according to an example embodiment.

3.0 Approach for Switching Transport Protocol Connection Keys 3.1 Extended MD5 Option According to one embodiment, in order to facilitate a key switchover, network elements 110 and 120 utilize an extended MD5 option in a header of a TCP segment. FIG. 2 is a block diagram that illustrates a TCP Segment including an MD5 Option with an extended MD5 Option according to one example embodiment.

TCP Segment 201 includes TCP Header 202 and any TCP Options 204. In this particular embodiment, TCP Segment comprises a total of sixty bytes, each byte representing eight bits. Moreover, TCP Header 202 comprises twenty bytes while any TCP Options 204 are allocated a total of forty bytes. One such TCP Option is a Regular MD5 Option 211. Regular MD5 Option 211 comprises a total of twenty bytes. The Type 212 and Length 214 fields each comprise one byte and are used to identify the specific type of the option and the total length of the option, respectively. Next, the actual MD5 Signature 216 comprises sixteen bytes. Finally, Regular MD5 Option 211 maintains two bytes at the end of the option for Padding 218. The Padding bytes 218 of Regular MD5 Option 211 are non-functional and are typically ignored.

In one embodiment, an Extended MD5 Option 228 is created by utilizing the two bytes of padding 218. Thus, the Type 212, Length 214 and MD5 Signature 216 fields remain in tact while Padding 218 is utilized to implement the Extended MD5 Option 228. Extended MD5 Option 228 comprises a Type field 228A and a Length field 229B, each consisting of one byte. The Length field 229B corresponds to the length of the Extended MD5 option. Further, the Type field 229A of Extended MD5 Option 228 may be used to indicate a number of type settings of the Extended MD5 Option. In one embodiment, a first setting for Type 229A is a setting signifying initialization while a second setting signifies acknowledgment. For example, Type 229A may be set to correspond to a value of 20 or 21. A value of 20 represents KEYCHG_INIT while a value of 21 represents KEYCHG_ACK. KEYCHG_INIT represents initiation of a keychange request while KEYCHG_ACK represents acknowledgment of the keychange request. In another embodiment, a third type, corresponding to a third value may be established. For instance, a value of 22 may represent a KEYCHG_NACK which signifies a non-acknowledgment of the keychange request. Further, the type of the MD5 option is not restricted to any particular number of settings, and additional type settings may be utilized to implement the present invention. Thus, using the Type field 229A of Extended MD5 Option 228, network elements 110 and 120 may initiate and/or implement a key switchover.

3.2 Approach for Initiating a Key Switchover

Figure 3A:
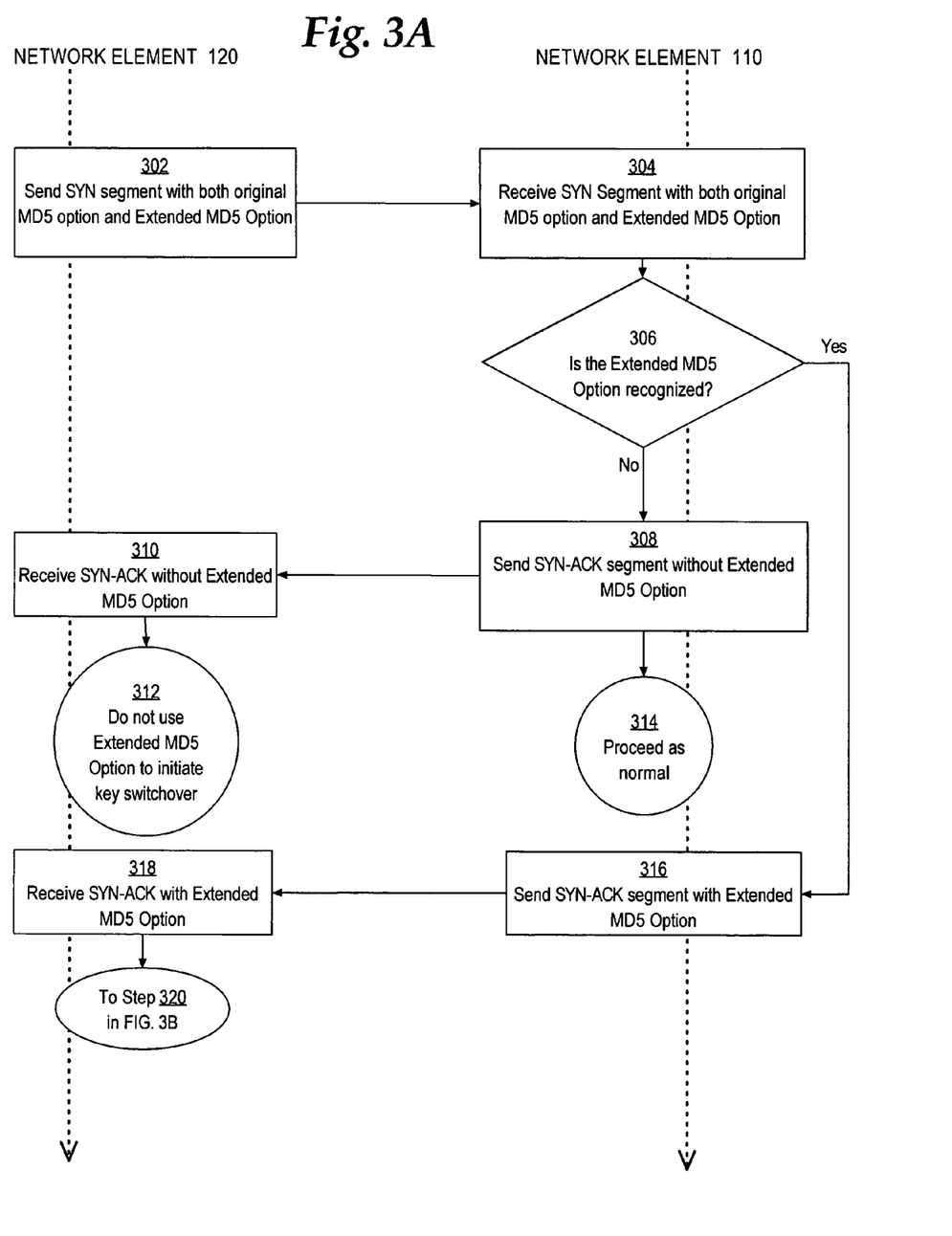
FIG. 3A is a flow diagram that illustrates an overview of a method for establishing an Extended MD5 Option for use in switching TCP MD5 encryption keys.

FIG. 3A is a flow diagram that illustrates an overview of a method for switching TCP MD5 encryption keys according to this example embodiment.

In one embodiment, before initiating a key switchover, network element 120 determines whether network element 110 is capable of understanding the Extended MD5 Option 228. For instance, at step 302, in a TCP three-way handshake to establish TCP connection 117, network element 120 sends a TCP Synchronize (SYN) segment with an MD5 Option, including the Extended MD5 Option 228 occupying the last two bytes of the MD5 Option, to network element 110.

At step 304, network element 110 receives the TCP SYN segment and proceeds to step 306. At step 306, network element 110 reads the TCP SYN segment, including the MD5 option. Because the MD5 Option includes the extended MD5 Option in its last two bytes, TCP Module may either acknowledge or ignore the value indicated in Type field 229A. For instance, and for purposes of providing an example, in a Regular MD5 Option 211, Padding 218 might be represented by a value of zero (0). A TCP module configured to use the Regular MD5 Option is configured to ignore the Padding field 218 and process the rest of the Regular MD5 Option 211. Thus, any value in the Padding field 218 is ignored.

However, a TCP module configured to use the Extended MD5 Option also is configured to process the padding filed 218 as the Extended MD5 Option 228. For the purpose of explanation, assume TCP module 124 is configured to use the Extended MD5 Option. In one embodiment, if a Regular MD5 Option is sent to TCP Module 124, TCP Module 124 will inspect the last two bytes of the Regular MD5 Option and find a value of zero (0). However, alternatively, if an Extended MD5 Option is sent to TCP Module 124, TCP Module will inspect the last two bytes of the MD5 Option, specifically Type field 229A, and find a non-zero value. Recognizing that the value of the last 2 bytes of the MD5 Option is non-zero, TCP Module 124 determines that an Extended MD5 Option has been used to communicate across TCP connection 117. In one embodiment, the non-zero value of Type field 229A may be 20, 21 or 22. Therefore, network element 110 will either acknowledge the Extended MD5 Option or simply ignore it.

Assuming both network elements have been preconfigured to recognize the original MD5 option, if network element 110 does not recognize the Extended MD5 Option, the extended MD5 option will be ignored, and in step 308, network element 110 will respond by sending a TCP SYN-Acknowledgment (SYN-ACK) segment to network element 120 with the original MD5 option but without the Extended MD5 Option.

At step 310, network element 120 receives the TCP SYN-ACK segment without the extended MD5 option. Because network element 120 received the TCP SYN-ACK response from network element 110 without the Extended MD5 Option, network element 120 is now informed that network element 110 is not configured to use the extended MD5 option to facilitate a key switchover. Thus, at step 312, network element 120 does not initiate a key switchover using the extended MD5 option and proceeds with the TCP three-way handshake.

Returning to step 306, if network element 110 understands the extended MD5 option in the TCP SYN segment sent from network element 120, network element 110 proceeds to step 316 and sends a TCP SYN-ACK segment including the extended MD5 option to network element 110. This is done, for example, by responding with a non-zero value in Type field 229A of Extended MD5 Option. In other embodiments, network element 120 may respond with a particular value indicating acknowledgment of the Extended MD5 Option.

At step 318, network element 120 receives the TCP SYN-ACK segment with the extended MD5 Option. Because the extended MD5 Option was included in the TCP SYN-ACK segment sent by network element 110, network element 120 now knows that network element 120 is configured to use the extended MD5 option to facilitate a key switchover. At this point, or at any other subsequent time, network element 120 proceeds to step 320 in FIG. 3B to initiate a key switchover.

3.3 Approach for Completing a Key Switchover

Figure 3B:
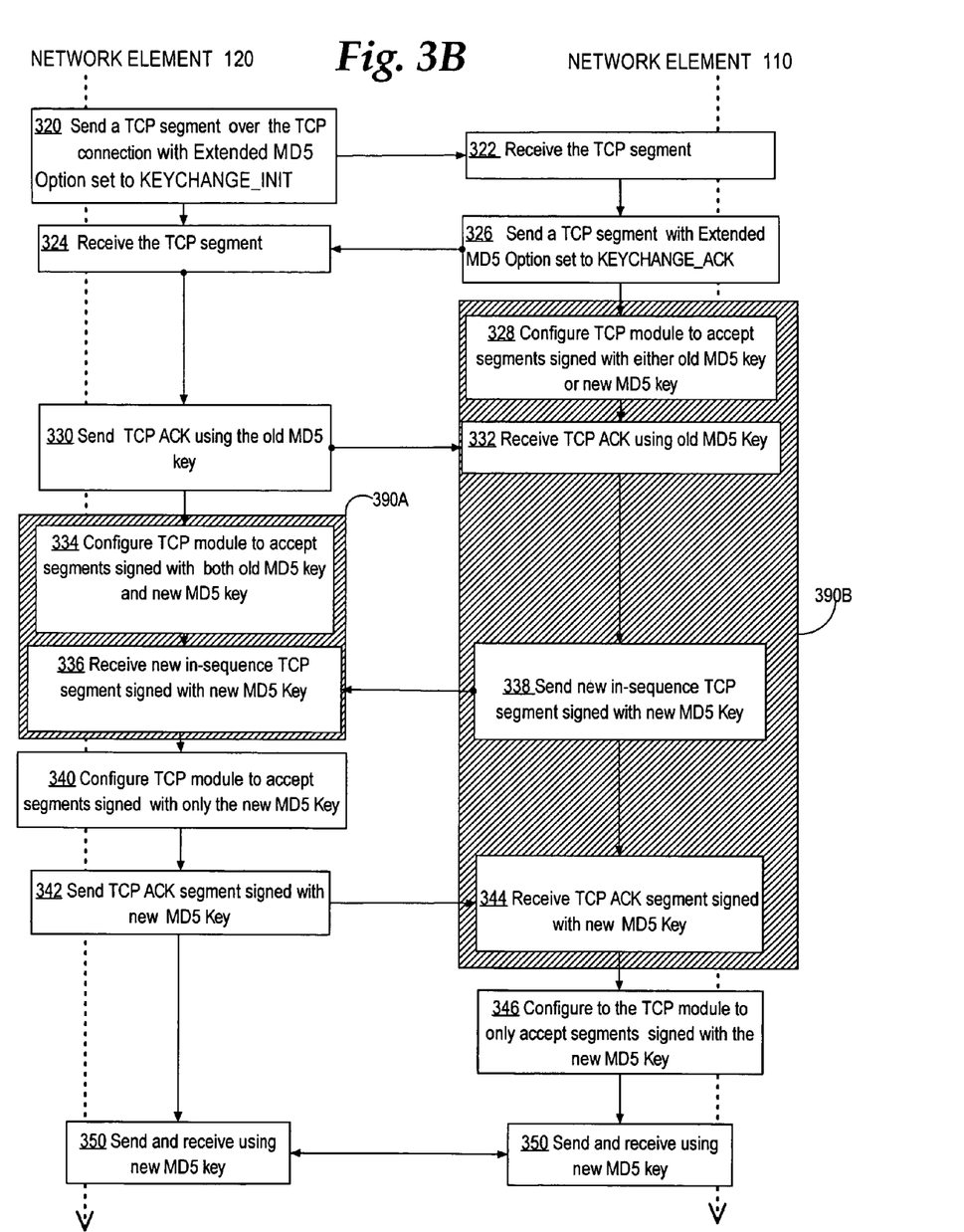
FIG. 3B is a continuation of the flow diagram in FIG. 3A and illustrates an overview of a method for switching MD5 encryption keys according to an example embodiment.

FIG. 3B is a continuation of the flow diagram in FIG. 3A and illustrates an overview of a method for switching TCP MD5 encryption keys according to this example embodiment.

Initially, both network element 120 and network element 110 are communicating over TCP connection 117 by signing all TCP segments with a first MD5 encryption key. After determining that network element 110 is capable of utilizing the Extended MD5 Option, network element 120 will now be ready to initiate a key switchover. In one embodiment, when network element 120 wants to initiate a key switchover, at step 320, network element 120 sends a TCP segment over TCP connection 117 to network element 110 with the Extended MD5 Option set to KEYCHANGE_INIT, which may be represented by a value of 20 in Type field 229A. At step 322, when network element 110 receives the TCP segment and interprets the Extended MD5 Option to signify initialization of a keychange request, network element 110, at step 326, responds by sending a TCP segment with Extended MD5 Option set to KEYCHANGE_ACK, which may be represented by a value of 21 in Type filed 229A. As a result of the KEYCHANGE_INIT message, at step 328, network element 110 configures TCP Module 124 to accept TCP segments signed with either the first MD5 encryption key or a new MD5 encryption key. Both the first MD5 encryption key and the new MD5 encryption key may be specified by a list of keys 119A and 119B which has been pre-provisioned to both network elements 120 and 110. Alternatively, in another embodiment, network element 110 may configure TCP Module 124 to accept TCP segments signed with either the first MD5 encryption key or a new MD5 encryption key directly after it receives the initial TCP segment at step 322.

At step 324, network element 120 receives the TCP segment with the Extended MD5 Option set to TCP_KEY_CHANGE_ACK, and, at step 330, responds by sending a TCP ACK segment signed with the first MD5 encryption key.

In one embodiment, network element 120 sends a TCP ACK segment along with the next data that is to be sent to network element 110. In other embodiments, network element 110 may respond may sending a "dummy" TCP ACK segment, i.e., a TCP ACK segment with no real data attached.

As a result of receiving the acknowledgment of the key-change request at step 324, network element 120 configures TCP Module 114 to accept messages signed with both the old MD5 encryption key and the new MD5 encryption key at step 334. Note that in other embodiments, however, network element 120 may complete this configuration before or after it sends the TCP ACK segment in 330.

At this point, both network elements 120 and 110 have been configured to accept messages signed with either the old MD5 encryption key or the new MD5 encryption key. This key "overlap" is signified by 390A and 390B. Note that during this time, network elements 110 and 120 are both signing messages with only one MD5 encryption key but accepting messages signed with both the old and new MD5 encryption key.

At step 332, network element 110 receives the TCP ACK segment signed with the old MD5 encryption key from network element 120. Because network element 110 is in the intermediate state, network element 110 is configured to accept messages signed with either the old MD5 encryption key or the new MD5 encryption key. Thus, network element 110 will accept the TCP ACK segment from network element 120. As a result of receiving the TCP ACK segment, network element 110 will determine that network element 120 is prepared to accept TCP segments signed with the new MD5 encryption key.

In one embodiment, at step 338, network element sends a new in-sequence TCP segment signed with the new MD5 encryption key. A new in-sequence TCP segment may be a TCP segment containing data not previously sent to network element 120. For instance, network elements 120 and 110 have the ability to determine the sequence number of data segments through use of the TCP protocol such that if a first segment sent from network element 120 has a sequence number of n, the next new segment sent from network element 120 will have a sequence number of n+1. Using this mechanism, if network element 120 sends segments with sequence number 1, 2 and 3 to network element 110, network element 110 can confirm that it has received segments 1, 2 and 3. However, if network element 110 receives segment sequence 4 without receiving segment sequence 3, network element 110 will not send a new in-sequence segment signed with the new MD5 encryption key.

At step 336, network element 120 receives the new in-sequence TCP segment signed with the new MD5 encryption key. By receiving the new in-sequence TCP segment with the new MD5 encryption key, network element 120 can determine that there are no more remaining TCP segments to be received signed with the old key. In one embodiment, network element 120 can determine this by confirming that it has received every TCP segment preceding N, where N is the sequence number of the new TCP segment signed with the new MD5 encryption key. Thus, if the sequence number of the new TCP segment is 5, network element 120 will need to confirm that it has received TCP segment sequence numbers 1, 2, 3 and 4 from network element 110. If network element 120 receives the new in-sequence TCP segment signed with the new MD5 encryption key and with a sequence number N+1, but has not received the TCP segment with sequence number N, network element 120 will not proceed to step 342 and send a TCP ACK segment signed with the new MD5 encryption key. Instead, network element 120 will continue to send TCP segments signed with the old MD5 encryption key until it can determine that it has received all TCP segments with sequence numbers before N+1. Thus, with this ability, network element 120 can determine that there are no remaining TCP segments to be received signed with the old MD5 encryption key.

At step 340, network element 120 configures TCP module 114 to only accept TCP segments signed with the new MD5 encryption key. At step 342, network element 120 sends a TCP ACK segment signed with the new MD5 encryption key to network element 110. In one embodiment, network element 120 may send the TCP ACK segment along with the next data that is to be sent to network element 110. In another embodiment, network element 110 may respond may sending a "dummy" TCP ACK segment, more specifically, a TCP ACK segment with no real data attached.

At step 346, network element 110 configures the TCP module to only accept packets signed with the new MD5 encryption key. Thereafter, at step 350, both network elements 120 and 110 send and receive all TCP segments using the new MD5 encryption key. Thus, a successful key switchover has been accomplished.

4.0 Implementation Mechanisms—Hardware Overview

Figure 4:
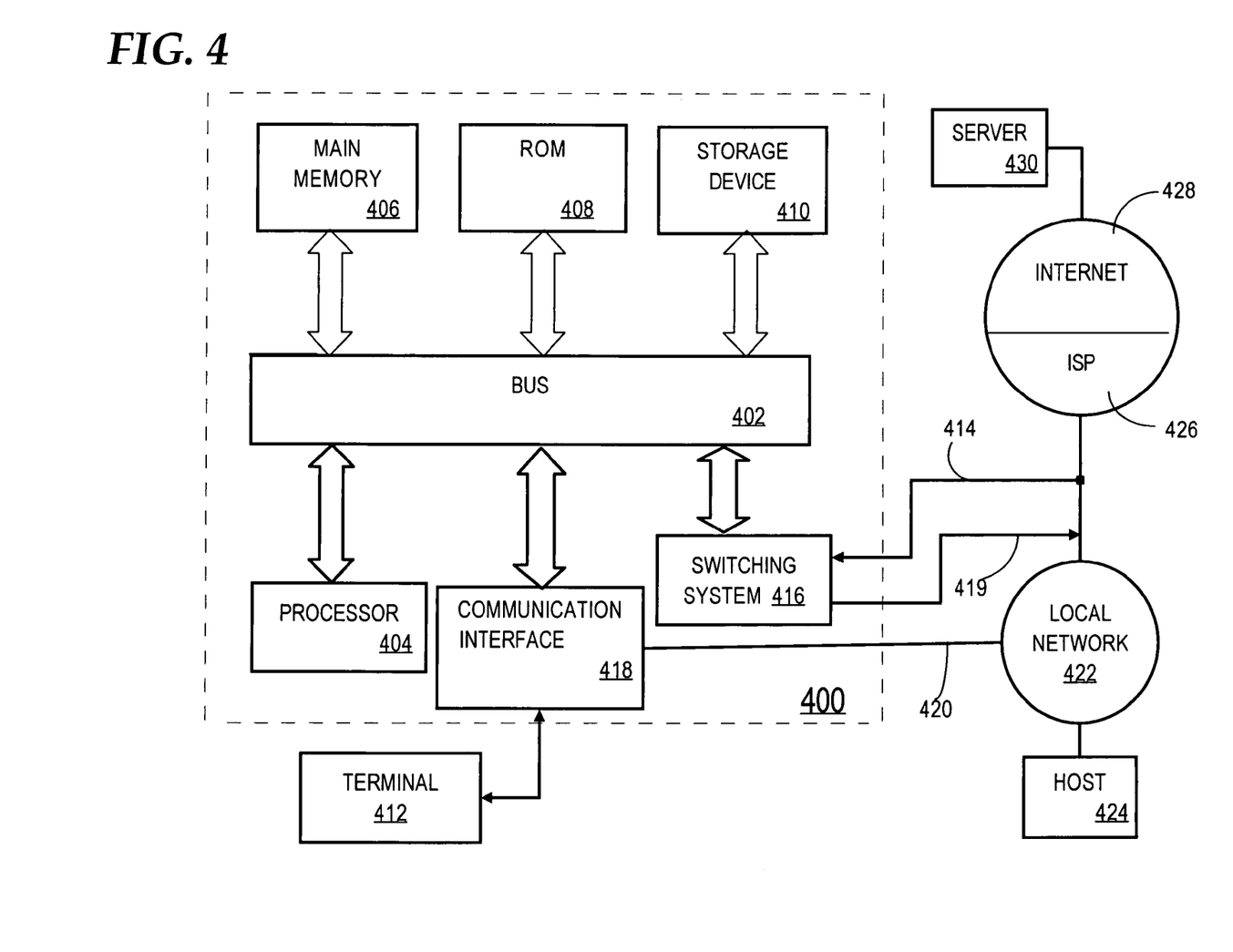
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for switching transport protocol connection keys. According to one embodiment of the invention, approaches for switching transport protocol connection keys are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable medium, being a non-transitory signal, may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for switching transport protocol connection keys as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of switching transport protocol connection keys, the method comprising the computer-implemented steps of:

within one communication session:

a first computer network node sending a keychange request message from the first network node to a second node, wherein said keychange request message causes the second node to accept, from the first computer network node, subsequent non-confirmed first-key messages that are digitally signed with a first key and subsequent non-confirmed second-key messages that are digitally signed with a second key;

wherein the second key is a next key in a pre-provisioned list of keys for the first and second nodes and a message digitally signed with a particular key from the pre-provisioned list of keys can be accepted using only the particular key;

the first computer network node receiving a first response message from the second node acknowledging the receipt of the keychange request message;

based on the first response message, the first computer network node accepting, from the second node, the subsequent non-confirmed first-key messages digitally signed with the first key and the subsequent non-confirmed second-key messages digitally signed with the second key;

the first computer network node receiving a first subsequent message digitally signed with the second key from the second node;

the first computer network node determining that there are no remaining non-confirmed first-key messages to be received digitally signed with the first key, and in response thereto, only accepting second-key messages digitally signed with the second key from the second node and sending a second subsequent message digitally signed with the second key to the second node, wherein said second subsequent message causes the second node to accept only the second-key messages digitally signed with the second key.

2. The method of claim 1, wherein the keychange request message comprises an Extended Message-Digest5 (MD5) Option in a header of a Transmission Control Protocol (TCP) segment.

3. The method of claim 2, wherein the Extended MD5 Option comprises a last two bytes of a regular MD5 Option in the header of the TCP segment.

4. The method of claim 1, wherein:
the keychange request message includes an Extended MD5 Option with a first setting, wherein the first setting represents an initialization of the keychange request; and
the first response message includes an Extended MD5 Option with a second setting, wherein the second setting represents acknowledgment of the keychange request.

5. The method of claim 1 wherein the first key is an MD5 encryption key and the second key is an MD5 encryption key.

6. The method of claim 1, further comprising first computer network node determining that the second network node is configured to facilitate a key switchover using an Extended MD5 Option in a header of a TCP segment.

7. The method of claim 1 wherein the first subsequent message is in a new in-sequence TCP segment and the second subsequent message is in a TCP ACK segment.

8. The method of claim 1 wherein said first key and said second key are selected from a list of keys supplied to said first node and said second nodes.

9. An apparatus for switching transport protocol connection keys, comprising:
one or more processors;
one or more stored sequences of instructions which, when executed by the one or more processors, cause the one or more processors to perform the steps of:
within one communication session:
sending a keychange request message from a first network node to a second node, wherein said keychange request message causes the second node to accept, from the first network node, subsequent non-confirmed first-key messages that are digitally signed with a first key and subsequent non-confirmed second-key messages that are digitally signed with a second key;
wherein the second key is a next key in a pre-provisioned list of keys for the first and second nodes and a message digitally signed with a particular key from the pre-provisioned list of keys can be accepted using only the particular key;
receiving a first response message from the second node acknowledging the receipt of the keychange request message;
based on the first response message, accepting, from the second node, the subsequent non-confirmed first-key messages digitally signed with the first key and the subsequent non-confirmed second-key messages digitally signed with the second key;
receiving a first subsequent message digitally signed with the second key from the second node;
determining that there are no remaining non-confirmed first-key messages to be received digitally signed with the first key, and in response thereto, only accepting second-key messages digitally signed with the second key from the second node and sending a second subsequent message digitally signed with the second key to the second node, wherein said second subsequent message causes the second node to accept only the second-key messages digitally signed with the second key.

10. The apparatus of claim 9, wherein the keychange request message comprises an Extended Message-Digest5 (MD5) Option in a header of a Transmission Control Protocol (TCP) segment.

11. The apparatus of claim 10, wherein the Extended MD5 Option comprises a last two bytes of a regular MD5 Option in the header of the TCP segment.

12. The apparatus of claim 9, wherein:
the keychange request message includes an Extended MD5 Option with a first setting, wherein the first setting represents an initialization of the keychange request; and
the first response message includes an Extended MD5 Option with a second setting, wherein the second setting represents acknowledgment of the keychange request.

13. The apparatus of claim 9 wherein the first key is an MD5 encryption key and the second key is an MD5 encryption key.

14. The apparatus of claim 9, wherein the one or more stored sequences of instructions further cause the one or more processors to perform the step of determining that the second network node is configured to facilitate a key switchover using an Extended MD5 Option in a header of a TCP segment.

15. The apparatus of claim 9 wherein the first subsequent message is in a new in-sequence TCP segment and the second subsequent message is in a TCP ACK segment.

16. The apparatus of claim 9 wherein said first key and said second key are selected from a list of keys supplied to said first node and said second nodes.

17. An apparatus for switching transport protocol connection keys, comprising:
for one communication session:
means for sending a keychange request message from a first network node to a second node, wherein said keychange request message causes the second node to accept, from the first network node, subsequent non-confirmed first-key messages that are digitally signed with a first key and subsequent non-confirmed second-key messages that are digitally signed with a second key;
wherein the second key is a next key in a pre-provisioned list of keys for the first and second nodes and a message digitally signed with a particular key from the pre-provisioned list of keys can be accepted using only the particular key;
means for receiving a first response message from the second node acknowledging the receipt of the keychange request message;
based on the first response message, means for accepting, from the second node, the subsequent non-confirmed first-key messages digitally signed with the first key and the subsequent non-confirmed second-key messages digitally signed with the second key;

means for receiving a first subsequent message digitally signed with the second key from the second node;

means for determining that there are no remaining first-key messages to be received digitally signed with the first key, and in response thereto, only accepting second-key messages digitally signed with the second key from the second node and sending a second subsequent message digitally signed with the second key to the second node, wherein said second subsequent message causes the second node to accept only the second-key messages digitally signed with the second key.

18. The apparatus of claim 17, wherein the keychange request message comprises an Extended Message-Digest5 (MD5) Option in a header of a Transmission Control Protocol (TCP) segment.

19. The apparatus of claim 18, wherein the Extended MD5 Option comprises a last two bytes of a regular MD5 Option in the header of the TCP segment.

20. The apparatus of claim 17, wherein:

the keychange request message includes an Extended MD5 Option with a first setting, wherein the first setting represents an initialization of the keychange request; and the first response message includes an Extended MD5 Option with a second setting, wherein the second setting represents acknowledgment of the keychange request.

21. The apparatus of claim 17 wherein the first key is an MD5 encryption key and the second key is an MD5 encryption key.

22. The apparatus of claim 17, further comprising the step of determining that the second network node is configured to facilitate a key switchover using an Extended MD5 Option in a header of a TCP segment.

23. The apparatus of claim 17 wherein the first subsequent message is in a new in-sequence TCP segment and the second subsequent message is in a TCP ACK segment.

24. The apparatus of claim 17 wherein said first key and said second key are selected from a list of keys supplied to said first node and said second nodes.

25. A computer-readable medium, being a non-transitory signal, carrying one or more sequences of instructions for switching transport protocol connection keys, which instructions, when executed by one or more processors, cause the one or more processors to carry out the steps of:

within one communication session:

sending a keychange request message from a first network node to a second node, wherein said keychange request message causes the second node to accept, from the first network node, subsequent non-confirmed first-key messages that are digitally signed with a first key and subsequent non-confirmed second-key messages that are digitally signed with a second key;

wherein the second key is a next key in a pre-provisioned list of keys for the first and second nodes and a message digitally signed with a particular key from the pre-provisioned list of keys can be accepted using only the particular key;

receiving a first response message from the second node acknowledging the receipt of the keychange request message;

based on the first response message, accepting, from the second node, the subsequent non-confirmed first-key messages digitally signed with the first key and the subsequent non-confirmed second-key messages digitally signed with the second key;

receiving a first subsequent message digitally signed with the second key from the second node;

determining that there are no remaining non-confirmed first-key messages to be received digitally signed with the first key, and in response thereto, only accepting second-key messages digitally signed with the second key from the second node and sending a second subsequent message digitally signed with the second key to the second node, wherein said second subsequent message causes the second node to accept only the second-key messages digitally signed with the second key.

26. The computer-readable medium as in claim 25, wherein the keychange request message comprises an Extended Message-Digest5 (MD5) Option in a header of a Transmission Control Protocol (TCP) segment.

27. The computer-readable medium as in claim 26, wherein the Extended MD5 Option comprises a last two bytes of a regular MD5 Option in the header of the TCP segment.

28. The computer-readable medium as in claim 25, wherein:

the keychange request message includes an Extended MD5 Option with a first setting, wherein the first setting represents an initialization of the keychange request; and the first response message includes an Extended MD5 Option with a second setting, wherein the second setting represents acknowledgment of the keychange request.

29. The computer-readable medium as in claim 25 wherein the first key is an MD5 encryption key and the second key is an MD5 encryption key.

30. The computer-readable medium as in claim 25, further comprising instructions, which, when executed by one or more processors, cause the one or more processors to carry out the step of determining that the second network node is configured to facilitate a key switchover using an Extended MD5 Option in a header of a TCP segment.

31. The computer-readable medium as in claim 25 wherein the first subsequent message is in a new in-sequence TCP segment and the second subsequent message is in a TCP ACK segment.

32. The computer-readable medium as in claim 25 wherein said first key and said second key are selected from a list of keys supplied to said first node and said second nodes.

* * * * *

UNITED STATES PATENT AND TRADEMARK OFFICE
CERTIFICATE OF CORRECTION

| | | |
|---|---|---|
| PATENT NO. | : 7,706,381 B2 | Page 1 of 1 |
| APPLICATION NO. | : 11/329509 | |
| DATED | : April 27, 2010 | |
| INVENTOR(S) | : Satish K. Mynam, Anantha Ramaiah and Chandrashekhar Appanna | |

It is certified that error appears in the above-identified patent and that said Letters Patent is hereby corrected as shown below:

In Section (75) Inventors, line 2:

Delete "Anatha Ramaiah, Sunnyvale, CA (US);" and insert --Anantha Ramaiah, Sunnyvale, CA (US);--

Signed and Sealed this

Sixth Day of July, 2010

David J. Kappos
*Director of the United States Patent and Trademark Office*